US005988244A

United States Patent [19]

Chang

[11] Patent Number: 5,988,244

[45] Date of Patent: Nov. 23, 1999

[54] SAFETY LINER FOR PROTECTING TUBELESS TIRES

[76] Inventor: Tung-shun Chang, P.O. Box 55-175, Taichung, Taiwan

[21] Appl. No.: 09/153,888

[22] Filed: Sep. 16, 1998

Related U.S. Application Data

[63] Continuation of application No. 08/885,860, Jun. 30, 1997, abandoned.

[51] Int. Cl.[6] .......... B60C 17/04

[52] U.S. Cl. .......... 152/158; 152/520

[58] Field of Search .......... 152/158, 520

[56] References Cited

U.S. PATENT DOCUMENTS

| | | | |
|---|---|---|---|
| 3,587,702 | 6/1971 | Kaunitz | 152/158 |
| 4,046,182 | 9/1977 | Farnsworth | 152/158 |
| 4,252,170 | 2/1981 | Watts | 152/158 |
| 4,270,592 | 6/1981 | Patecell | 152/158 |
| 4,346,747 | 8/1982 | Osada et al. | 152/158 |
| 5,186,771 | 2/1993 | Carpentier et al. | 152/520 |

*Primary Examiner*—Geoffrey L. Knable

[57] ABSTRACT

A safety liner for protecting the tubeless tires is provided. The liner is combined a predetermined number of segment of identical shape to form a circular configuration for disposing in place into the drop center of a tire rim and adjustably locked up by a coupling member at the confronting ends of the circular configuration. A wedge plate slidably secures between each segment and the drop center at one side and a cushion runner disposes between the circular configuration and the drop center at the other side. When the tire becomes flat, the flexible outer surface of the liner engages with the inner surface of the tire that permits a vehicle continuous operation. Because the liner is combined by a plurality of segments, it is structurally flexible to suite to different types of tire rim and because the segments are in identical shape, it facilitate a mass production and low cost to manufacture.

19 Claims, 8 Drawing Sheets

SAFETY LINER FOR PROTECTING TUBELESS TIRES

This is a continuation application of a U.S. pending application, Ser. No. 08/885,860, filed Jun. 30, 1997, now abandoned.

BACKGROUND OF THE INVENTION

The present invention relates to safety liner for protecting tubeless tires and more particularly to an improved safety liner for protecting tubeless tires for continuous operation when the tire fails or becomes flat, which liner is a combination of a predetermined number of segments to form a circular configuration suitable to secure the drop center of rims of different type and size. So that this segment enables to automatic massive production with a single mould and to readily combine into a desired circular configuration, thus reducing the cost to manufacture.

Typical safety liner for tires as shown in U.S. Pat. No. 4,393,911 which discloses a pair of symmetrical semi-circular segments releasably placed around the drop center of a rim and two links are reinserted in registering openings in the confronting ends of the adjacent liner segments and are releasably secured in place by two bolts. Then, to adjust the two sections to draw then together snugly around the outside of the associated tire rim. Two eccentrics mounted in the other ends of the links are rotated slightly to cause the confronting ends of the two liner segments to be drawn snugly together.

U.S. Pat. No. 3,394,749 discloses the safety inserts for tubeless tires which is formed from a channel shaped arcuate segments attached one to the other to form a ring having a resilient member on its outer periphery which supports the inner surface of a tubeless tire on deflation. The ring is mounted on an adapter seated in the drop center of the rim. The ring has also serrations on inner periphery stopping against the rim so as to provide friction between the inserts and the rim. However, they have common structure disadvantages set forth as follow:

a) The semi-circular member is produced in fixed size. Although their adjustable links provide a slight flexibility, they only serve for specific sized rims of tubeless tires. To serve for different sized rims, they have to prepare different mould which increases the cost to manufacture and lessens marketability.

b) The confronting ends of the semi-circular segments are engaged by pins or by hexagon headed screws. This linking structure is unstable and deformable for the high temperature and vibration because of the rotation of the tire in high speed, thus causing danger on tire deflation.

The present invention is arisen to militate and/or obviate the foregoing disadvantages set forth in the above prior art references.

SUMMARY OF THE PRESENT INVENTION

The present invention has a main object to provide a safety liner for protecting tubeless tires on deflation which is combined with a plurality of predetermined number of segments each including an identical size and configuration and attached one to another to form a circular liner so as to decrease the cost to prepare a single mould for making the segment.

Another object of the present invention is to provide a safety liner for protecting the tubeless tires on deflation which the segment has a simplified structure facilitating an automatic mass production.

Still another object of the present invention is to provide a safety liner for protecting the tubeless tires on deflation which the segment has a inversal curved surface so as to conforming the drop center of different sized rims.

Further object of the present invention is to provide a safety liner for protecting the tubeless tires on deflation which the segments each has two grooved ends alternately engageable one with another so as to be readily combinable and pivotally secured by suitable connection pins.

Further object of the present invention is to provide a safety liner for protecting the tubeless tires on deflation which the segment each has a wedge plate prepared to insert into axis a receiving space in a bottom thereof for supporting the right side relative to the longitudinal axis of the segment against the drop center of the rim.

Further object of the present invention is to provide a safety liner for protecting the tubeless tires on deflation, in which cushion means is prepared to support the under side of the inversal curved surface against the left side of the drop center of the rim.

Still further object of the present invention is to provide a safety liner for protecting the tubeless tires on deflation in which a flexible locking device is prepared at the confronting ends of the combined circular liner which is adjustable to alter the length of the liner so that the liner can be completely fittable to the rim.

The present invention will become more fully understood by reference to the following detailed description thereof when read in conjunction with the attached drawings.

DETAILED DESCRIPTION OF THE PREFERRED EMBODIMENT

Figure 1:
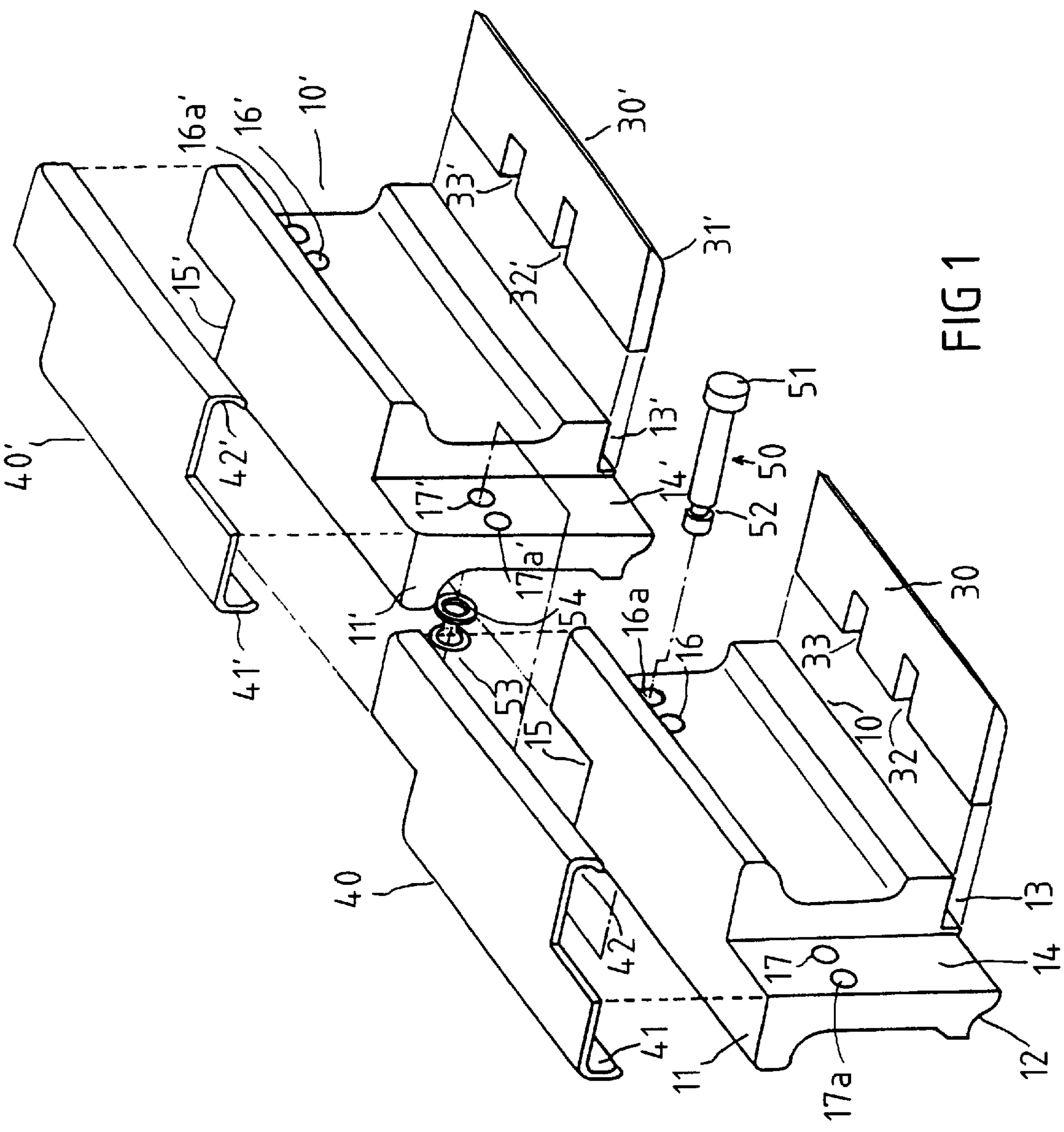
FIG. 1 is an exploded perspective view to show the structural correlation between a pair of identical segments of the preferred embodiment according to the present invention.
Figure 2:
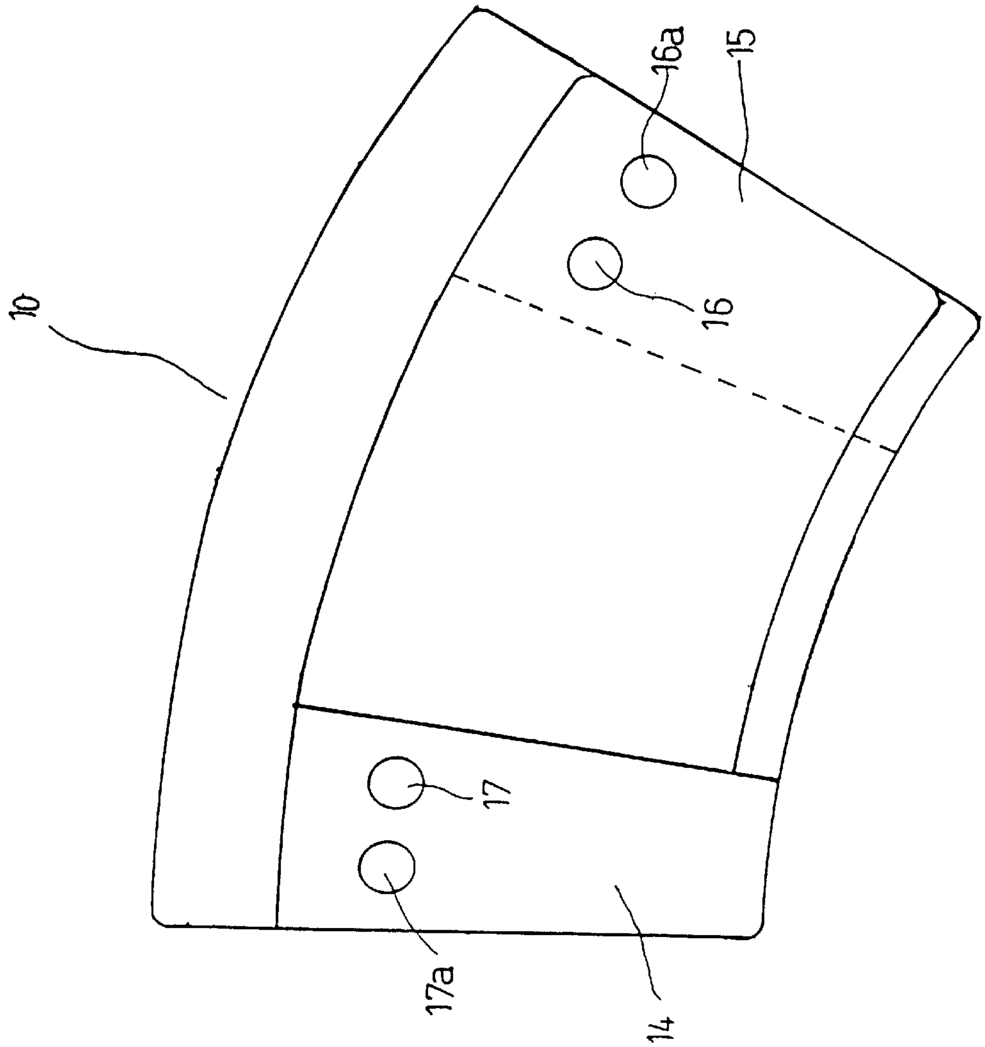
FIG. 2 is an elevational view to show a segment of the present invention.
Figure 3:
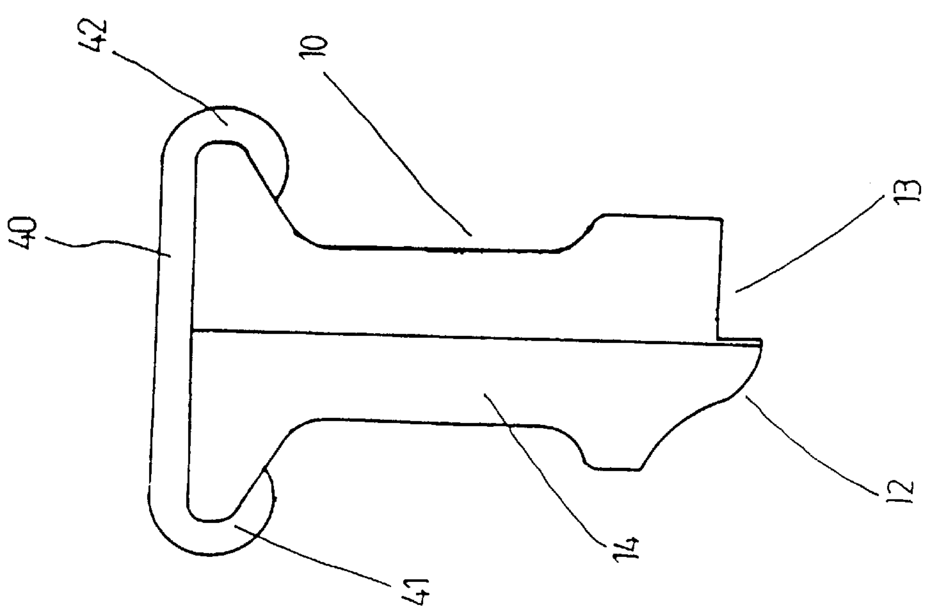
FIG. 3 is a side elevational view of FIG. 2.
Figure 4:
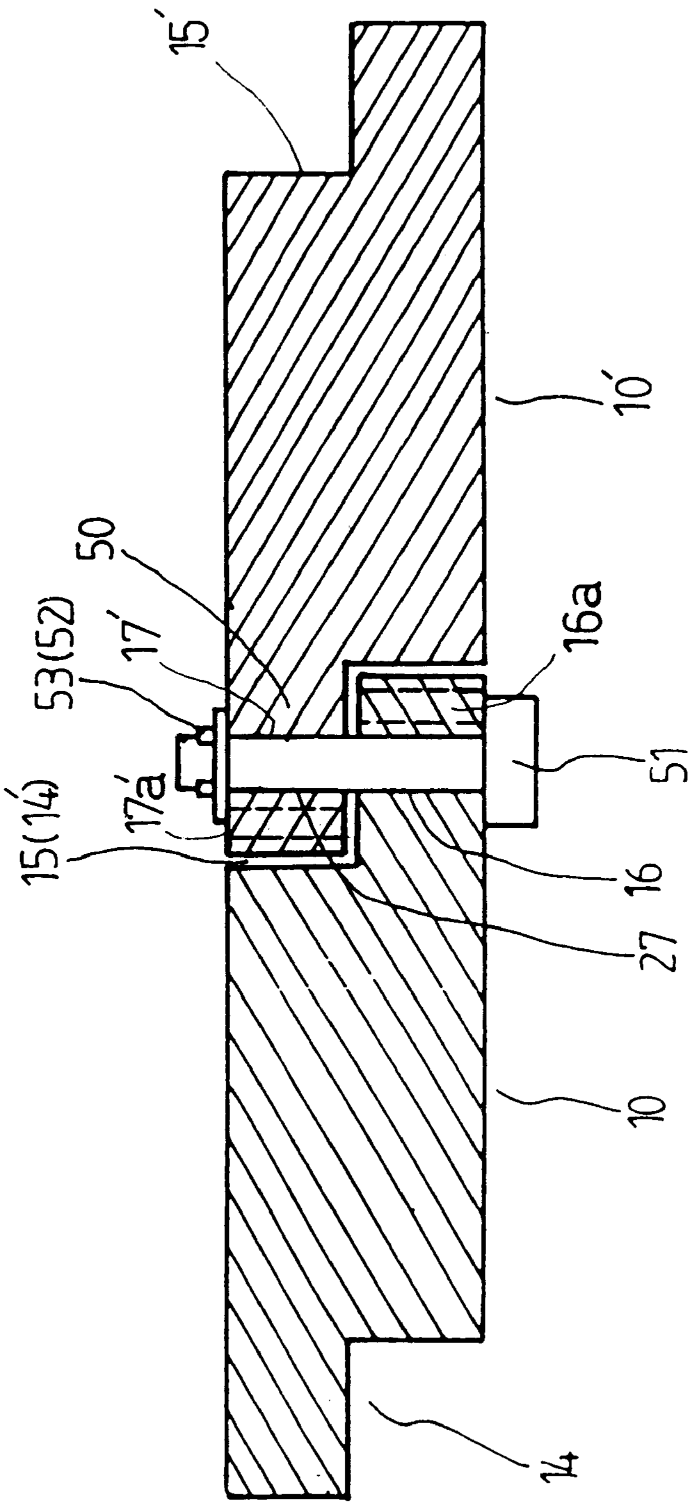
FIG. 4 is a sectional view indicating the connection of adjacent segments by a locking pin.
Figure 6:
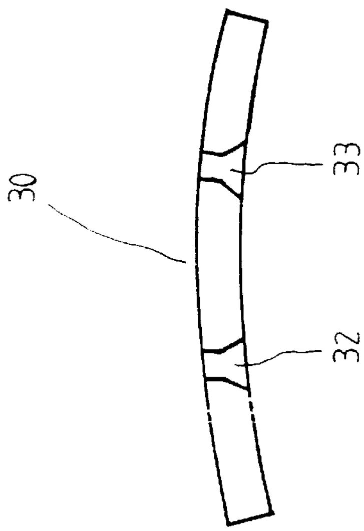
FIG. 6 is a side view of FIG. 5.
Figure 5:
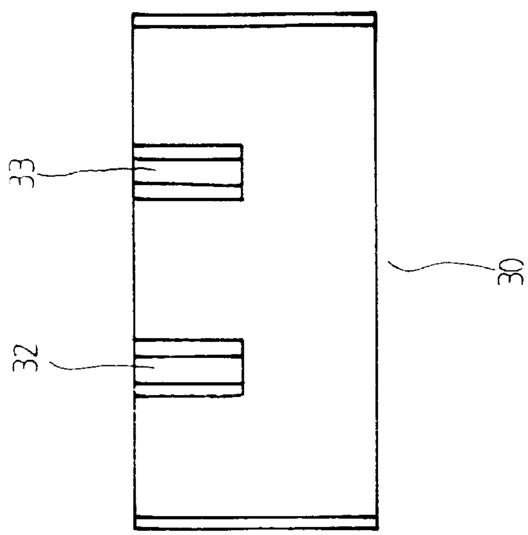
FIG. 5 is a top plane view to show a wedge plate of the present invention.
Figure 9:
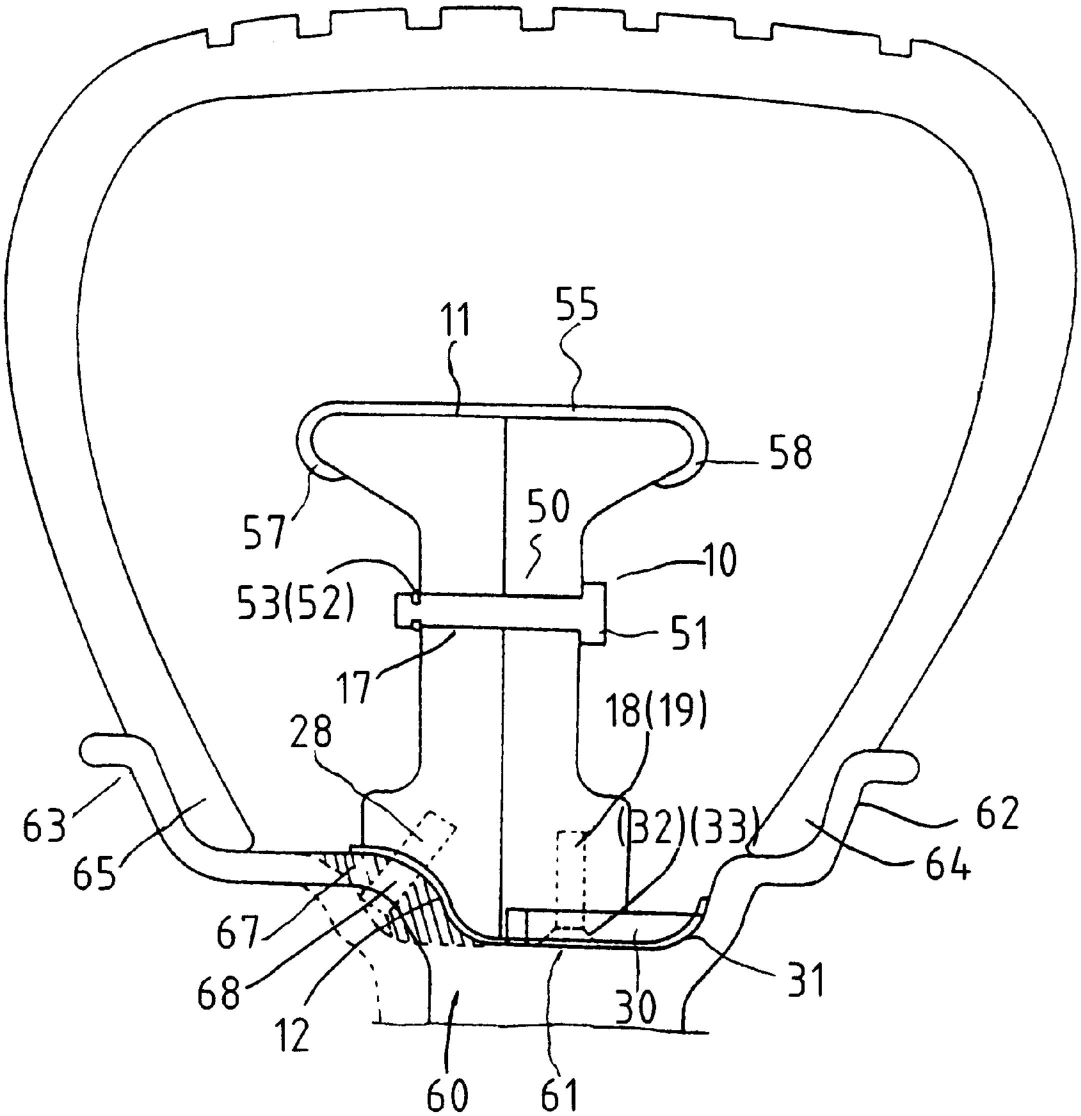
FIG. 9 is a sectional view to illustrate the safety liner of the present invention mounting into the drop center of the rim of a tubeless tire.
Figure 10:
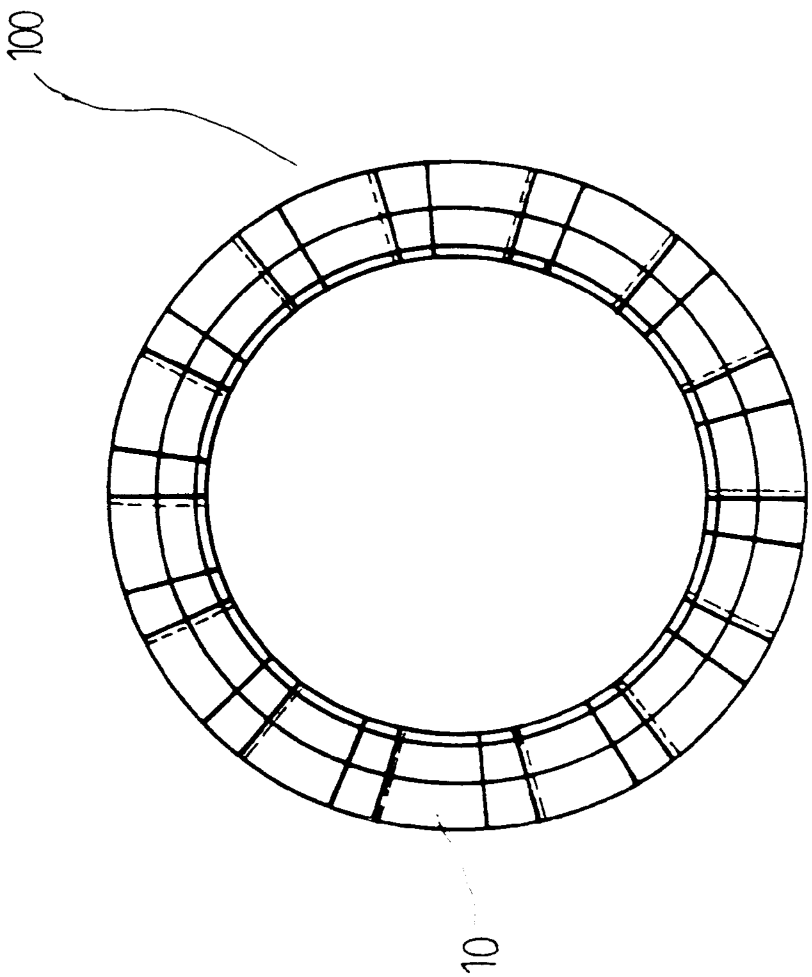
FIG. 10 is a side elevation illustrating a safety liner of the present invention combined with a plurality of segments.

With reference to the drawings and initiating from FIGS. 1 to 3, the safety liner for protecting the tubeless tires on deflation of the present invention is combined with a plurality of predetermined number of identical segments 10 to form a circular configuration 100 (as shown in FIG. 10)

fittable to snugly secure to a drop center of a rim. The number of the segments 10 may be even or odd depending upon the diameter of the rim, assuming that the safety liner of 14 inches diameter is required, the number of the segments is fourteen, if the diameter is 15 inches, fifteen segments must be employed and etc. FIG. 1 shows a pair of the foregoing segments denoted as 10 or 10' which comprises an arcuate rectangular body 11 or 11' of a roughly I-shaped section, an inversal curved surface 12 formed in a left bottom, an arcuate rectangular receiving space 13 in a right bottom relative to the longitudinal axis of the segment 10, a first grooved coupling end 14, a second grooved coupling end 15 alternately formed relative to the first grooved coupling end 14 so that each pair of adjacent segments 10 are engageable, a pair of first thru holes 16 and **16*a* formed in an appropriate center of the second grooved coupling end 15 registering with a pair of second thru holes 17 and 17*a* in an appropriate center of the first grooved coupling end 14. Both the thru holes 16*a* and 17*a* at each coupling ends 14 and 15 are prepared to facilitate the user using at option in order to have more flexibility in dealing with different depths of the drop center of the rim. The segment 10 further has a pair of first and second vertical threaded recesses 18 and 19 formed spaced apart in the upper wall of the receiving space 13 and a slant threaded recess 28 in a center of the inversal arcuate surface 12 (as shown in FIG. 9). The wedge plate 30 slidably inserts into the receiving space 13 and secured to the segment 10 by appropriate fastening means such as a ramp head screw 61 as shown in FIG. 9. The plate 30 is generally rectangular in form and has a streamlined surface 31 on underside abutting the outward edge for confronting with the inner surface of the drop center and a pair of notches 32 and 33 of dovetail section facing the inward side relative to the receiving space 13. The notches 32 and 33 of dovetail section engageable with the shank and the ramp head of the screw 61 so that the plate 30 can be transversely slidable within the receiving space 13 in order to fit any sized rim. A cover means 40 which is made from flexible material such as rubber or plastic has a shape conforming with the arcuate recatngular surface 11 of the segment 10 so as to be firmly attached thereto, a first and a second introversively arcuate side walls 41 and 42 fittable to the lateral protrusions of the segment 10 so that they are fixedly clasping the protrusions (as shown in FIGS. 2 and 3). A locking pin 50 adapted to secure between the adjacent segments 10 together during combination, the pin 50 includes a cylinder body engageable into the first and second thru holes 16, 16*a*, 17 and 17*a*, a large diameter round head screw 51 at one end and an annular groove 52 proximal the other end. When combining, engage the second grooved coupling end 15 of a first segment 10 with the first grooved coupling end 14' of a second or adjacent segment 10' until making sure that the first thru holes 16 or 16*a* is aligned with the second thru hole 17' or 17*a*', then, insert the locking pin 50 into the thru holes 16 or 16*a* and 17' or 17*a*' and secure the pin 50 with a C-shaped retaining ring 53 and a washer 54 within the annular groove 52 which will emerges from the other end of the thru hole 17' or 17*a*'. Because both the first and second grooved coupling ends 14 and 15 are approximately right angled so that the combination of the segments 10 is deemed to be stable. Furthermore, the chamfered edges are formed on the upper and lower ends of the segment 10, there would be no interference acurred between the adjacent segments 10. FIG. 4 shows a combination of adjacent segments 10 and 10' by a locking pin 50**.

Figure 7:
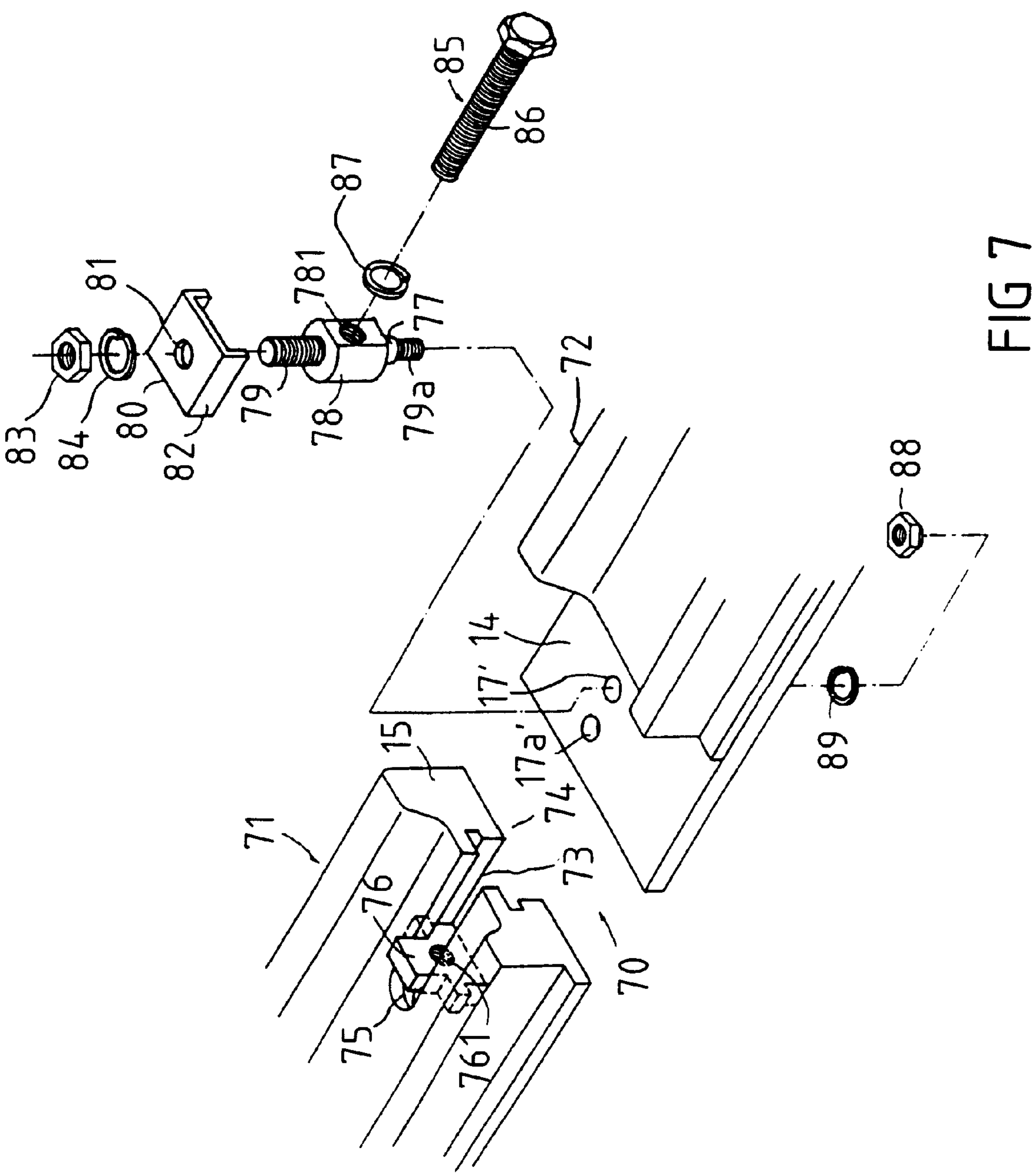
FIG. 7 is an exploded perspective view illustrating the adjacent locking device at confronting ends of the circular safety liner.
Figure 8:
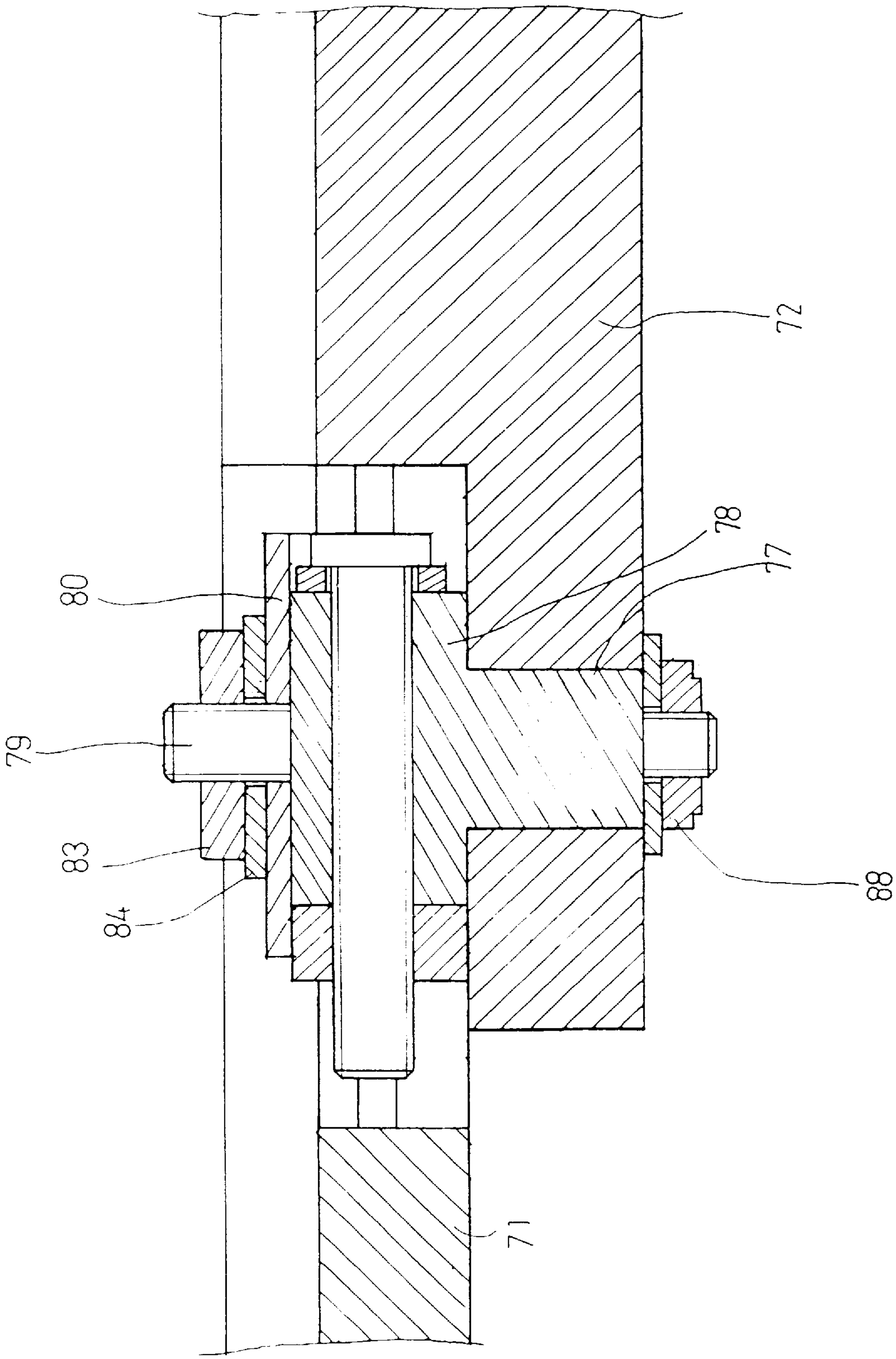
FIG. 8 is a sectional view to show a locked up condition of FIG. 7.

Referring to FIGS. 7 and 8 of the drawings, an adjustable locking device 70 is formed at the confronting ends of the well combined segments 10. For the purpose of easier understanding, the segments 10 at that confronting end are axially turned about 90 degrees relative to FIG. 1, and their grooved coupling ends 14 and 15 are respectively reformed and re-denoted as 71 and 72 for cooperating with other components of the device 70. You'll see that the thru holes 16 and **16*a* in the flat portion of the coupling end 71 which is positioned at a first confronting end of the circular liner 100 has been omitted and instead of is centrally formed a longitudinal slot 75 of an inverse T-shaped section. The slot 75 includes an opened outer end and a T-shaped bolt 76 including a threaded central bore 761 embedded into the inner end of the slot 75 and integrated with the coupling end 71 with the narrow upper portion engaged with the narrow portion 73 and a wide portion 74. Whereas the thru hole 17' and 17*a*' in the flat portion of the coupling end 72 or of the second confronting remain unchanged for rotatably receiving a locking means 77 which includes a cylinder body insertable into the thru hole 17' or 17*a*', a large diameter semi-cylinder portion 78 having transverse thru hole engageable with the wide portion 74 of the slot 75, a threaded upper shank 79 on the top center of the semi-cylinder portion 78 and a threaded lower shank 79*a*, a rectangular nut 80 which has a flat portion 81, a central bore 81 engageable with the threaded upper shank 79 and a pair of downward bending portions 82 perpendicular to a pair of opposite edges, a first bolt 83 fastening the upper shank 79 with a first washer 84 positioned therebetween, a king screw 85 having threaded shank 86 insertable into the transverse hole 781 and fastened into the threaded central bore 761 of the T-shaped bolt 76 with a second washer 87 engaged therebetween and a second bolt 88 engageable with the threaded lower shank 79*a* with a third washer 89 positioned therebetween. When assembling, first insert the semi-cylinder portion 78 into the hole 17' or 17*a*' and secure by the bolt 88 with the washer 89 positioned therebetween, nevertheless, the semi-cylinder portion 78 is somewhat rotatable in the thru hole 17' or 17*a*', then, draw the confronting ends 71 and 72 together by fastening the king screw 85 into the threaded central bore 761. This time, sleeve the rectangular nut 80 onto the shank 79 and fasten both the bolts 83 and 88 onto the shanks 79 and 79*a* respectively with the washer engaged therebetween. So that the semi-cylinder portion 78 is completely restrained and can no longer be swung. If the length of the circular liner 100 needs to adjust again, unfastening both the nut 83 and 88 and the rectangular nut 80 and rotatably fastening or unfastening the king screw 85 and then fastening the bolt 83 and 88** again.

Referring to FIG. 9 which is a sectional view to show a combined circular safety liner 100 of the present invention mounting up to the drop center of the rim of a tubeless tire. The rim 60 is generally a V-shaped section including a drop center, a first and a second bead flange 62 and 63 for respectively forming the seats for the first and second beads 64 and 65 of a tire 66. Before mounting the circular liner 100 onto the rim 60, the wedge plate 30 has to be laterally adjusted to conforming with the surface of the drop center. In FIG. 9, it assumes that the circular liner 100 has already been mounted onto the drop center by means of the adjustable locking device 70 in the manner as recited above. Note that the tire 66 is normally mounted in such manner that the second bead 65 (or left side bead thereof in FIG. 9) is first engaged in place into the second bead flange 63 and then insert the first bead 64 of the tire 66 in place into the first bead flange 62. When the beads 64 and 65 are all in place in the rim 60, the second bead 65 should drop deeper to a position as shown by the broken line. After inflation, the bead 65 will be moved up to a normal place closer to the flange 63 and the introversive arcuate surface 12 of the segments 10 shall be engageable with the arcuate surface of the drop center 61. If it is not disengageable because of different type of the rim 60, a cushion runner 67 may be adaptable to remedy the gap therebetween (as shown in the tilt lines in FIG. 9). The cushion runner 67 includes a plurality of recesses formed spaced apart for embedding the retaining pins 68 which are made in registry with the slant threaded recess 28 centrally formed in the introversive arcuate surface 12 of each of the segments 10. This arrangement facilitates the safety liner 100 of the present invention suitable to any different type of the rims 60. Further, a flat rubber cushion may be placed between the wedge plate 30 and the drop center of the rim 60 (not shown) to provide more flexibility and friction hereto for obviating the tire on deflation from damaged on an uneven surface.

FIG. 10 indicates a well combined safety liner 100 of the present invention which is composed of a predetermined number of segments 10 which contact with the drop center of the tire snugly at two points (i.e. the two engaging notches 32,33) which provide more flexibility to protect the deflated tire from damaged on an uneven surface either.

Accordingly, the safety liner for protecting tubeless tires of the present invention provides novel features and advantages set forth as follows:

a) the circular liner is combined with a plurality of segments which are of identical shape and facilitate to a massive production and low cost to manufacture, b) a flexible structure of the safety liner can suite to any different type rims of tubeless tires, c) two points (i.e. the two engaging notches 32,33) attachment between the segment and the drop center of the rim provides greater flexibility to protect a deflated tubeless tire from damaged on an uneven surface, d) an adjustable locking device to firmly and adjustably couple the confronting end of the circular liner shall be safe and durable, and e) comfered edges formed on the upper and lower end of the segment will obviate any interference between the adjacent elements.

Note that the specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. A safety liner for protecting tubeless tires, comprising:

a plurality of segments connected by a plurality of locking means, wherein each of said segments is a roughly rectangular body of generally I-shaped section having arcuate upper and lower surfaces, a first grooved coupling end, a second grooved coupling end alternatively formed relative to said first grooved coupling end and engageable with each other when combined, a first central thru hole and a second central thru hole laterally formed through a flat vertical wall of each of said first and second grooved coupling ends, a generally rectangular receiving space formed along a right portion of a bottom surface relative to a longitudinal line of said segment including a pair of threaded vertical recesses centrally formed spaced apart in an upper wall thereof and an interoversive arcuate surface formed along a left portion of said bottom surface relative to said receiving space in a center of which a threaded slant recess is formed;

means for adjustably coupling confronting ends of said connected segments for securing said safety liner to a drop center of a tire rim of a tubeless tire;

wedge means to be disposed in said receiving space defined between each of said segments and said drop center of said rim for transversely slidable within said receiving space for fitting different sizes of said rim; and a cushion runner to be secured between said segments and said drop center for facilitating said safety liner suitable to different types of said rim.

2. The safety liner as recited in claim 1 wherein said wedge means is a generally rectangular plate engageable within said receiving space of said segment and slightly wider than said receiving space and includes an arcuate under side abutting outward edge and a pair of notches of dovetail section formed spaced apart in inner edge each having an opening toward said receiving space and made in registry with said threaded vertical recesses so that said notches are slidably secured to said threaded vertical recesses by means of a pair of ramp head bolts respectively.

3. The safety liner as recited in claim 1 wherein said segment further includes a cover means having a flat body conforming with an arcuate shape of said upper surface of said segment and attached thereto and a pair of introversively arcuate lateral walls firmly attached to a pair of protrudent lateral edges of said upper surface of said segment.

4. The safety liner as recited in claim 3 wherein said cover means is made from flexible material.

5. The safety liner as recited in claim 1 wherein each of said locking means is a cylinder pin having a large diameter round head and an annular groove formed proximal a forward end, said pin inserted sequentially into said respective thru hole of said second grooved coupling end of one of said segments and said respective thru hole of said first grooved coupling end of said adjacent segment and then secured by a C-shaped retaining ring in a groove with a washer therein between.

6. The safety liner as recited in claim 2 wherein each of said locking means is a cylinder pin having a large diameter round head and an annular groove formed proximal a forward end, said pin inserted sequentially into said respective thru hole of said second grooved coupling end of one of said segments and said respective thru hole of said first grooved coupling end of said adjacent segment and then secured by a C-shaped retaining ring in a groove with a washer therein between.

7. The safety liner as recited in claim 3 wherein each of said locking means is a cylinder pin having a large diameter round head and an annular groove formed proximal a forward end, said pin inserted sequentially into said respective thru hole of said second grooved coupling end of one of said segments and said respective thru hole of said first grooved coupling end of said adjacent segment and then secured by a C-shaped retaining ring in a groove with a washer therein between.

8. The safety liner as recited in claim 1 wherein said means for adjustably coupling confronting ends comprises first confronting end in which a longitudinal slot of inverse T-shaped section is formed including a smooth narrow upper portion, a wide lower portion, an opening toward a second confronting end and a T-shaped nut embedded into an inner end of said longitudinal slot, said second confronting end including a pair of thru holes centrally formed in a flat portion rotatably engageable with a locking member, said locking member including a semi-cylinder portion engageable into said wide lower portion of said T-shaped slot, a first shank projected upward and a less diameter cylinder projected downward including a smaller second threaded shank engageable into one of said thru holes of said second coupling end and fastened by a first bolt with a first washer engaged therebetween, a rectangular nut sleeved onto said first shank and fastened by a second bolt with a second washer therebetween and a king screw having a threaded shank inserted through a transverse central bore of said semi-cylinder portion and fastened into said threaded central bore of said T-shaped nut of said first coupling end.

9. The safety liner as recited in claim 2 wherein said means for adjustably coupling confronting ends comprises first confronting end in which a longitudinal slot of inverse T-shaped section is formed including a smooth narrow upper portion, a wide lower portion, an opening toward a second confronting end and a T-shaped nut embedded into an inner end of said longitudinal slot, said second confronting end including a pair of thru holes centrally formed in a flat portion rotatably engageable with a locking member, said locking member including a semi-cylinder portion engageable into said wide lower portion of said T-shaped slot, a first shank projected upward and a less diameter cylinder projected downward including a smaller second threaded shank engageable into one of said thru holes of said second coupling end and fastened by a first bolt with a first washer engaged therebetween, a rectangular nut sleeved onto said first shank and fastened by a second bolt with a second washer therebetween and a king screw having a threaded shank inserted through a transverse central bore of said semi-cylinder portion and fastened into said threaded central bore of said T-shaped nut of said first coupling end.

10. The safety liner as recited in claim 3 wherein said means for adjustably coupling confronting ends comprises first confronting end in which a longitudinal slot of inverse T-shaped section is formed including a smooth narrow upper portion, a wide lower portion, an opening toward a second confronting end and a T-shaped nut embedded into an inner end of said longitudinal slot, said second confronting end including a pair of thru holes centrally formed in a flat portion rotatably engageable with a locking member, said locking member including a semi-cylinder portion engageable into said wide lower portion of said T-shaped slot, a first shank projected upward and a less diameter cylinder projected downward including a smaller second threaded shank engageable into one of said thru holes of said second coupling end and fastened by a first bolt with a first washer engaged therebetween, a rectangular nut sleeved onto said first shank and fastened by a second bolt with a second washer therebetween and a king screw having a threaded shank inserted through a transverse central bore of said semi-cylinder portion and fastened into said threaded central bore of said T-shaped nut of said first coupling end.

11. The safety liner as recited in claim 1 wherein said cushion runner has a shape conforming with said introversive arcuate surface of said segment and said bottom surface of said drop center of said rim so as to dispose therebetween and secure by threaded pins into said respective slant threaded recess of each of said combined segments.

12. The safety liner as recited in claim 2 wherein said cushion runner has a shape conforming with said introversive arcuate surface of said segment and said bottom surface of said drop center of said rim so as to dispose therebetween and secure by threaded pins into said respective slant threaded recess of each of said combined segments.

13. The safety liner as recited in claim 3 wherein said cushion runner has a shape conforming with said introversive arcuate surface of said segment and said bottom surface of said drop center of said rim so as to dispose therebetween and secure by threaded pins into said respective slant threaded recess of each of said combined segments.

14. The safety liner as recited in claim 5 wherein said cushion runner has a shape conforming with said introversive arcuate surface of said segment and said bottom surface of said drop center of said rim so as to dispose therebetween and secure by threaded pins into said respective slant threaded recess of each of said combined segments.

15. The safety liner as recited in claim 6 wherein said cushion runner has a shape conforming with said introversive arcuate surface of said segment and said bottom surface of said drop center of said rim so as to dispose therebetween and secure by threaded pins into said respective slant threaded recess of each of said combined segments.

16. The safety liner as recited in claim 7 wherein said cushion runner has a shape conforming with said introversive arcuate surface of said segment and said bottom surface of said drop center of said rim so as to dispose therebetween and secure by threaded pins into said respective slant threaded recess of each of said combined segments.

17. The safety liner as recited in claim 8 wherein said cushion runner has a shape conforming with said introversive arcuate surface of said segment and said bottom surface of said drop center of said rim so as to dispose therebetween and secure by threaded pins into said respective slant threaded recess of each of said combined segments.

18. The safety liner as recited in claim 9 wherein said cushion runner has a shape conforming with said introversive arcuate surface of said segment and said bottom surface of said drop center of said rim so as to dispose therebetween and secure by threaded pins into said respective slant threaded recess of each of said combined segments.

19. The safety liner as recited in claim 10 wherein said cushion runner has a shape conforming with said introversive arcuate surface of said segment and said bottom surface of said drop center of said rim so as to dispose therebetween and secure by threaded pins into said respective slant threaded recess of each of said combined segments.

* * * * *